(No Model.)

J. T. MORRISON.
WATER CLOSET REPAIR.

No. 593,025. Patented Nov. 2, 1897.

Witnesses,
B. P. Shepherd
W. C. Tooley

Inventor
John T. Morrison
By Paul & Hawley
his attorneys

UNITED STATES PATENT OFFICE.

JOHN T. MORRISON, OF MINNEAPOLIS, MINNESOTA.

WATER-CLOSET REPAIR.

SPECIFICATION forming part of Letters Patent No. 593,025, dated November 2, 1897.

Application filed January 13, 1897. Serial No. 619,094. (No model.)

*To all whom it may concern:*

Be it known that I, JOHN T. MORRISON, of the city of Minneapolis, county of Hennepin, State of Minnesota, have invented certain new and useful Improvements in Water-Closet Repairs, of which the following is a specification.

This invention relates to improvements in devices designed especially for repairing water-closets.

Water-closet bowls are usually provided with projecting nozzles or necks to which the flushing-pipes are connected. It frequently happens that from the settling of the building or contraction or expansion of the pipe connections or other causes these pipes or nozzles are broken off. It is the object of my invention to provide a device by which the closet may be quickly and cheaply repaired. The device may of course be used in connection with the bowls or closets which are not provided with such necks or nozzles.

My invention consists generally in the constructions and combinations hereinafter described, and particularly pointed out in the claims.

Figure 1:
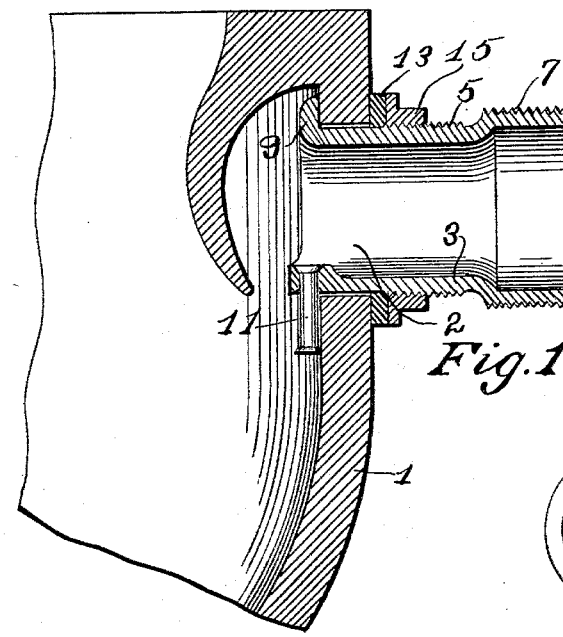
Figure 2:
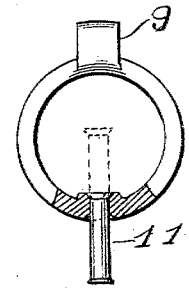
Figure 3:
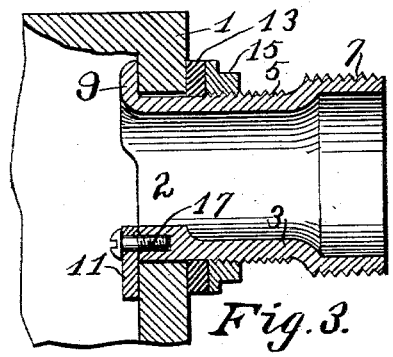
Figure 4:
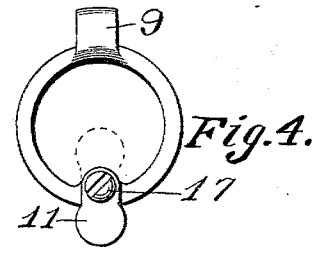

In the accompanying drawings, forming part of this specification, Figure 1 is a central section of one of my improved devices connected to the bowl of a water-closet. Fig. 2 is an end elevation of the device, a portion being shown in section. Fig. 3 is a central vertical section showing a slightly-modified construction. Fig. 4 is an end elevation of the device shown in Fig. 3.

In the drawings, 1 represents a portion of a water-closet bowl.

2 represents the inlet-opening, which will either be surrounded by an inlet-nozzle and which, in this instance, is supposed to have been broken off, or the bowl may be made without any inlet-nozzle and my device applied thereto to take the place of such inlet-nozzle.

3 represents a pipe-section exteriorly screw-threaded at 5 and 7. The diameter of the pipe at its outer end or that part that is supplied with the screw-thread 7 is preferably greater than the other portion of the pipe. The opposite end of the pipe-section is provided with the lugs 9 and 11. As here shown, the lug 9 is in the form of a lip made integrally with the end of the pipe-section, while the lug 11 is movable and slides in a slot or opening in said pipe-section, the movement of said lug being at right angles to the center line of the pipe-section. The lug 11 is preferably arranged to slide freely in the opening in the pipe-section, but it is prevented from dropping out of said opening by suitable heads or lips at the ends thereof.

13 represents a rubber or other suitable packing or washer, and 15 is a nut arranged upon the screw-threaded portion 5 of the pipe-section.

The lug 11, instead of being made to slide in the opening in the pipe-section, may be pivoted thereto by a suitable pivot 17, upon which said lug turns from the position indicated by dotted lines in Fig. 4 to the position shown by full lines in the same figure.

If preferred, the fixed lug 9 may be omitted and a second lug 11, or more than one, may be used in the place of the said fixed lug 9.

To apply the device, the collar or nut 15 is screwed back upon the pipe-section and the section is turned over, so as to bring the lug 11 uppermost. The lug will then slide down, so that its outer end is flush with the surface of the pipe-section. The lug 9 is then hooked into the opening and the end of the pipe-section is brought through said opening. The section is then turned over, so as to bring the lug 11 at the bottom, and said lug will then drop down into the position shown in Fig. 1. The nut 15 is then screwed up, drawing the lugs 9 and 11 against the inside of the surface of the bowl and compressing the washer 13. The pipe may then be connected to the screw-threaded portion 7 of the section by any suitable or usual means.

The device may be used wherever it is desired to connect a pipe to any kind of receptacle.

It will be seen that the device is exceedingly simple and cheap in construction; that it may be quickly applied to any water-closet bowl in case the neck or nozzle becomes broken therefrom, or it may be applied to any such bowl that is originally constructed without a neck or nozzle. The interior of the pipe-section is substantially unobstructed and leaves a free passage through the pipe-section.

Having thus described my invention, I claim as new and desire to secure by Letters Patent—

1. In a device of the class described, a pipe connection having on its outer end means for tightening the pipe in the closet, and having on its inner end an extension, in combination with a movable part provided on said extension, and laterally movable after said extension is in position, substantially as described.

2. The combination, with the pipe section or coupling, of a transversely-slidable pin or lug arranged on the inner end thereof, and a fixed transverse lug also provided on the inner end of said coupling, substantially as described.

3. The combination, with a pipe section or coupling, having a laterally-projecting fixed lug, of a laterally-movable lug arranged substantially opposite said fixed lug, and adapted to be projected, after the coupling is in position for use, beyond the outer wall of the coupling, substantially as described.

4. The herein-described pipe section or coupling, formed integrally, and provided with a screw-threaded outer surface, and with a separate lug 11, and means for securing said lug upon said section at one end thereof and permitting it to be moved laterally, for the purpose set forth.

In testimony whereof I have hereunto set my hand this 11th day of January, A. D. 1897.

JOHN T. MORRISON.

In presence of—
A. C. PAUL,
M. E. GOOLEY.